United States Patent [19]

Sachs et al.

[11] Patent Number: 4,695,709
[45] Date of Patent: Sep. 22, 1987

[54] METHOD AND APPARATUS FOR HEATING AND CONTROLLING THE TEMPERATURE OF ULTRA SMALL VOLUMES

[75] Inventors: Frederick Sachs; Anthony Auerbach, both of Buffalo; Richard G. McGarrigle, Snyder; James E. Neil, Buffalo, all of N.Y.

[73] Assignee: The Research Foundation of State University of New York, Albany, N.Y.

[21] Appl. No.: 858,386

[22] Filed: May 1, 1986

[51] Int. Cl.$^4$ .............................................. H05B 1/02
[52] U.S. Cl. ................... 219/494; 219/497; 219/505; 128/736; 128/303.18
[58] Field of Search .............. 219/501, 497, 499, 504, 219/505; 128/642, 303.18, 736

[56] References Cited

U.S. PATENT DOCUMENTS

| | | | |
|---|---|---|---|
| 4,217,910 | 8/1980 | Khalil | 128/642 |
| 4,452,249 | 6/1984 | Sachs et al. | 128/642 |
| 4,488,558 | 12/1984 | Simbruner et al. | 128/642 |
| 4,565,200 | 1/1986 | Cosman | 128/642 |
| 4,590,363 | 5/1986 | Bernard | 219/497 |

*Primary Examiner*—M. H. Paschall
*Attorney, Agent, or Firm*—Donald C. Studley; Michael L. Dunn

[57] ABSTRACT

The present invention relates to an apparatus for the controlled heating of an ultra small volume. The invention provides a means of heating, measuring, and controlling the temperature in such ultra small volume. The present apparatus includes a heat-sensor portion comprised of an electrical resistance. Heat is generated in the heat-sensor portion by a flow of electrical current through such electrical resistance. The temperature in the heat-sensor portion is determined by measuring the electrical resistance of the circuit that includes the heat-sensor element. The apparatus is comprised of a thin-walled microcapillary tube filled internally with an electrically conductive material and coated externally with a dissimilar electrically conductive material. The external electrically conductive coating on the microcapillary tube is suitable a noble metal such as gold. The external metal coating preferably has a metallic overcoat to improve conductivity, and more preferably has a further overcoat, or outside layer, of a nonconductive material. Along the tip portion of the microcapillary tube the two dissimilar conductive materials (internal and external) meet to form a juncture of electrical resistance. This juncture is the heat-sensor portion serving both as the heating element and as the temperature sensor. The electrically conductive material inside the microcapillary tube and the electrically conductive coating on the outside of the microcapillary tube are connected to an electrical source as part of an electrical circuit.

10 Claims, 2 Drawing Figures

METHOD AND APPARATUS FOR HEATING AND CONTROLLING THE TEMPERATURE OF ULTRA SMALL VOLUMES

This invention was made with U.S. Government support under NS-13194 awarded by the National Institute of Health. The Government has certain rights in this invention.

BACKGROUND OF THE INVENTION

The present invention relates to heating and controlling the temperature of ultra small volumes, e.g., on the order of one picoliter (1000 cubic microns). The invention is particularly useful for rapidly heating and accurately controlling the temperature in such ultra small volumes. The present invention is particularly useful in providing means to rapidly and reversibly change and measure the change in temperature in cellular areas of microdimension, e.g., a single cell, portion of a cell, or groups of specific selected cells, The controlled heating may be carried out on cells or groups of cells within or without a living body.

The integrated heat-sensor devices of the present invention, referred to hereinafter as "thermodes", have heater portions which are heated by the passage of electrical current through an electrical resistance. The heater portion also serves as a sensor portion which measures the temperature of the heater portion facilitating controlled monitored changes in the electrical resistance of the electrical circuit containing the heater portion.

Devices to measure temperature by measuring changes in electrical resistance are known in the prior art. Examples are: U.S. Pat. Nos. 2,210,903; 2,711,650; 2,737,810; 2,779,917 and 2,938,385. Generally such devices utilize either a resistance thermometer or a thermistor as the probe, or temperature sensory element. Typically a resistance thermometer includes a metal, such as, platinum, nickel or copper or a semi-conductor material. Thermistors typically utilize a solid semi-conductor ceramic-like element, e.g., oxides of manganese, cobalt, copper, uranium, iron, zinc and magnesium.

Generally electrically conducting materials become more resistant to the passage of electrical current as temperature increases. The increase in electrical resistance is, within certain determinable limits, proportional to the increase in temperature. Thus, a temperature sensing element, or probe, may be used to determine temperature in the area of the probe by measuring increases or decreases in the electrical resistance of the probe.

To facilitate precise temperature measurement such temperature probes are typically incorporated as part of a resistance measuring circuit. If a source of constant potential is available, the measuring circuit may merely include an ammeter, the change in electrical current reflecting the change in resistance in the circuit. A resistance bridge network, for example, a meter bridge or a Wheatstone bridge, may be used. A bridge circuit allows a comparison of resistances. In such circuits the electrical resistance of the temperature probe is accurately determined by evaluating the resistance of the probe in a balanced bridge circuit and the temperature of the probe is derived from the electrical resistance of the probe. In a particularly useful embodiment, the resistance of the temperature probe is determined by instrument and directly read as temperature.

In contrast to resistance thermometers and thermistors, the present invention applies an electrical current to an electrical circuit containing a resistance to obtain a heated portion and utilizes the change of resistance of the circuit to control or monitor the heat generated.

The present invention is particularly useful in the study of cellular or membrane phenomena wherein the accurate, controlled heating of a cell or part of a cell is to be carried out. The ultra small thermode, or probe, of the present invention allows cell penetration without causing serious injury to the cell, or disruption of the cell structure or function. The study of cellular temperature response has heretofore been confined to the study of groups of large cells because of the large size of prior art probes. In the past such limitations were particularly severe in the study of vertebrate brain, spinal cord and retina cells where the vast majority of cells are smaller than about 20 microns in diameter. The present invention is particularly useful as a tool for studying the effect of heat and temperature in such small cells.

The present invention may suitably be utilized to control the temperature in patch-clamp recordings. In such applications the cooling bath may be kept cold and the membrane heated locally to allow for a good seal formation. The temperature may subsequently be varied without danger of expansion or contraction of the microscope stage which may disturb a cell-attached patch. The present device also has utility in microcalorimetry applications. For example, a thermodilution flow meter which would measure flow within capillaries may be made by heating the capillary to a specific temperature and measuring the speeds at which temperatures return to normal.

The present invention facilitates the study of temperature effects in ultra small volumes, cellular or subcellular. As used herein the term ultra small volumes means a volume less than about 1000 cubic microns. The probe portion of the present device encompasses the heating and sensing portions. Typically the probe has a diameter between about 0.5 and about 5.0 micron. It is postulated that the present invention may open research vistas not heretofore open which will encompass the study of the affects of temperature within a particular cell or particular cells within a group of cells.

The fabrication of microcapillary tubes aptly suited to use in the present invention is described in U.S. Application Ser. No. 693,725, filed Jan. 23, 1985, entitled, "METHOD AND APPARATUS FOR PRODUCING GLASS TUBING OF A NARROWED DIAMETER". Methods of applying metallic coatings to microcapillary tubes are disclosed in U.S. Pat. Nos. 4,452,249, "MICROELECTRODES AND PROCESS FOR SHIELDING SAME"; and 4,427,283, "MICROELECTRODE FABRICATING APPARATUS". The disclosures of the foregoing are hereby incorporated by reference.

BRIEF DESCRIPTION OF THE INVENTION

The present invention relates to an apparatus for the controlled heating of an ultra small volume. The invention provides a means of heating, measuring, and controlling the temperature in such ultra small volume. The present apparatus, termed "thermodes" includes a heat-sensor portion, or element, comprised of an electrical resistance. Heat is generated in the heat-sensor element by a flow of electrical current through such electrical resistance. The temperature in the heat-sensor element is determined by measuring the electrical resistance of the circuit that includes the heat-sensor element. The thermode of the present invention is comprised of a thin-walled microcapillary tube filled internally with an electrically conductive material and coated externally with an electrically conductive material. Suitably the internal electrically conductive material is a low melting point alloy. Alloys having melting points above 100° C. and below about 250° C. are particularly useful. The electrically conductive coating on the outside surface of the microcapillary tube suitably is of a noble metal, such as gold, preferably applied by sputtering or by vacuum evaporation. The external metal coating preferably has a metallic overcoat to improve conductivity, and more preferably has a further overcoat, or outside layer, of a nonconductive material. Along the tip portion of the microcapillary tube the two conductive materials (internal and external) meet to form an area of electrical resistance. Typically over 90 percent of the internal-to-external resistance (50 to 100 ohm) is localized in this area. The internal-to-external resistance area serves both as the heating element and as the temperature sensor. The electrical resistance of the heat-sensor is monitored and used to both measure and control the temperature of the heat-sensor. The electrically conductive material inside the microcapillary tube and the electrically conductive coating on the outside of the microcapillary tube are separately connected to an electrical source as part of an electrical circuit. The electrical source is selected to provide a composite flow through the circuit, that is, the circuit delivers a voltage for heating. Suitably the heating voltage is low frequency. The heating voltage has imposed thereon, or therewith a monitoring voltage, having a frequency well separated from the heating voltage. Typically the monitoring voltage is of a higher frequency than the heating voltage and typically is A.C. The monitoring voltage is selected to sense a change of resistance within the circuit without adding heat to the circuit. The monitoring voltage suitably controls the heating, voltage by commercially available control circuits well known in the art, for example, by means of a closed-loop serve circuit.

The apparatus is capable of producing a reversible step in temperature of 10° C. in from about 1 to about 5 milliseconds with relaxation times, in an aqueous medium, in the order of from about 1 to about 5 milliseconds.

The resistance portion of the present thermode typically ranges up to about 5.0 micron in diameter, and more preferably between about 0.1 and about 3.0 micron, and most preferably between about 0.5 and about 1.5 micron. Minute changes in the electrical resistance of the electrical circuit containing the heat-sensor element reflect minute temperature changes in the immediate volume, generally spherical, of the heat-sensor element.

Typically, the present invention can discern temperature changes as small as 0.1° C. in about 0.1 millisecond.

The monitoring source may suitably be selected to have a constant potential. In such case as the temperature of the heat-sensor element changes, the electrical current within the monitoring portion of the circuit changes. Thus, the change in current reflects a change in the resistance of the monitoring circuit which, in turn, reflects a temperature change in the area of the heat-sensor element.

DETAILED DESCRIPTION AND PREFERRED EMBODIMENT OF THE INVENTION

The present invention will now be described with reference to the accompanying drawings in which like components are denoted by similar numbers in each of the views.

Figure 1:
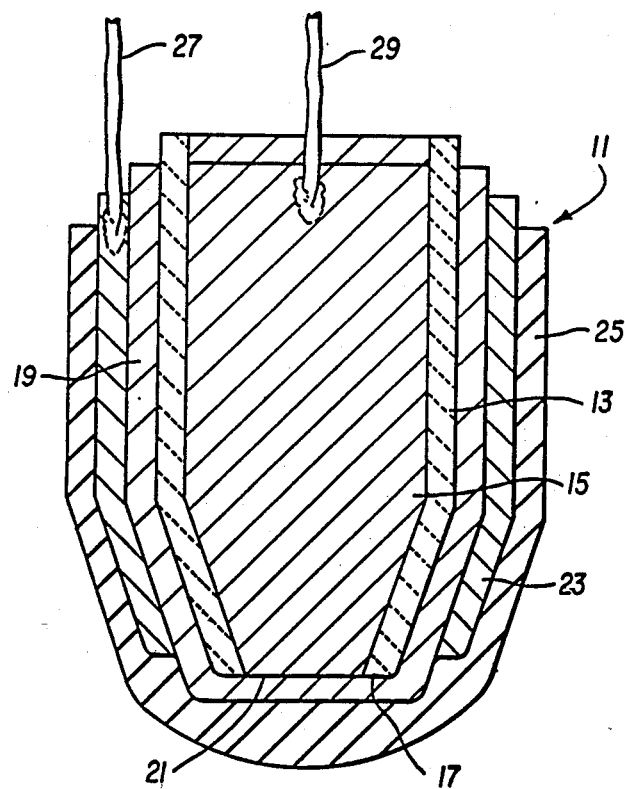
FIG. 1 is a frontal view in cross-section of a thermode of the present invention. The thermode is shown enlarged for ease of illustration.

Looking now at FIG. 1, the thermode, generally denoted as 11, is comprised of microcapillary tube 13, suitably fabricated of borosilicate glass. Microcapillary tube 13 is filled with an electrically conductive material, suitably a metal, 15. Metal 15 extends to the tip 17 of the capillary tube 13. Tip 17 is typically of a size from about 0.5 to about 5 micron. The outside surface of tube 13 has a thin, uniform coating 19 of an electrically conductive material, suitably a noble metal, such as gold. The external coating is preferably applied by sputtering or by vacuum evaporation. Coating 19 extends over tip 17 and is in contact with metal 15. This juncture 21, of coating 17 and metal 15 forms the electrical resistance which serves both as the heating element which heats the surrounding volume and as the temperature sensing element, which is the source of the electrical resistance used to measure and control the temperature of the heating element, and consequently the volume, generally spherical, surrounding tip 17.

Preferably, coating 19 is overcoated with a conductive material, for example, silver, to improve electrical conductivity. In accord an overcoat of metal 23 is suitably applied atop the initial layer 17. It is to be noted that the second conductive layer does not extend over the area nearest the heat-sensor element 21 on tip 17 of microcapillary tube 13.

The overcoat layer 23 is preferably also overcoated with an electrically insulating material 25. Depending upon the environment in which the device is to be used, overcoat 25 may or may not extend over the tip area of thermode 11. Electrical connections 27 and 29 are provided to connect the thermode into an electrical circuit.

Figure 2:
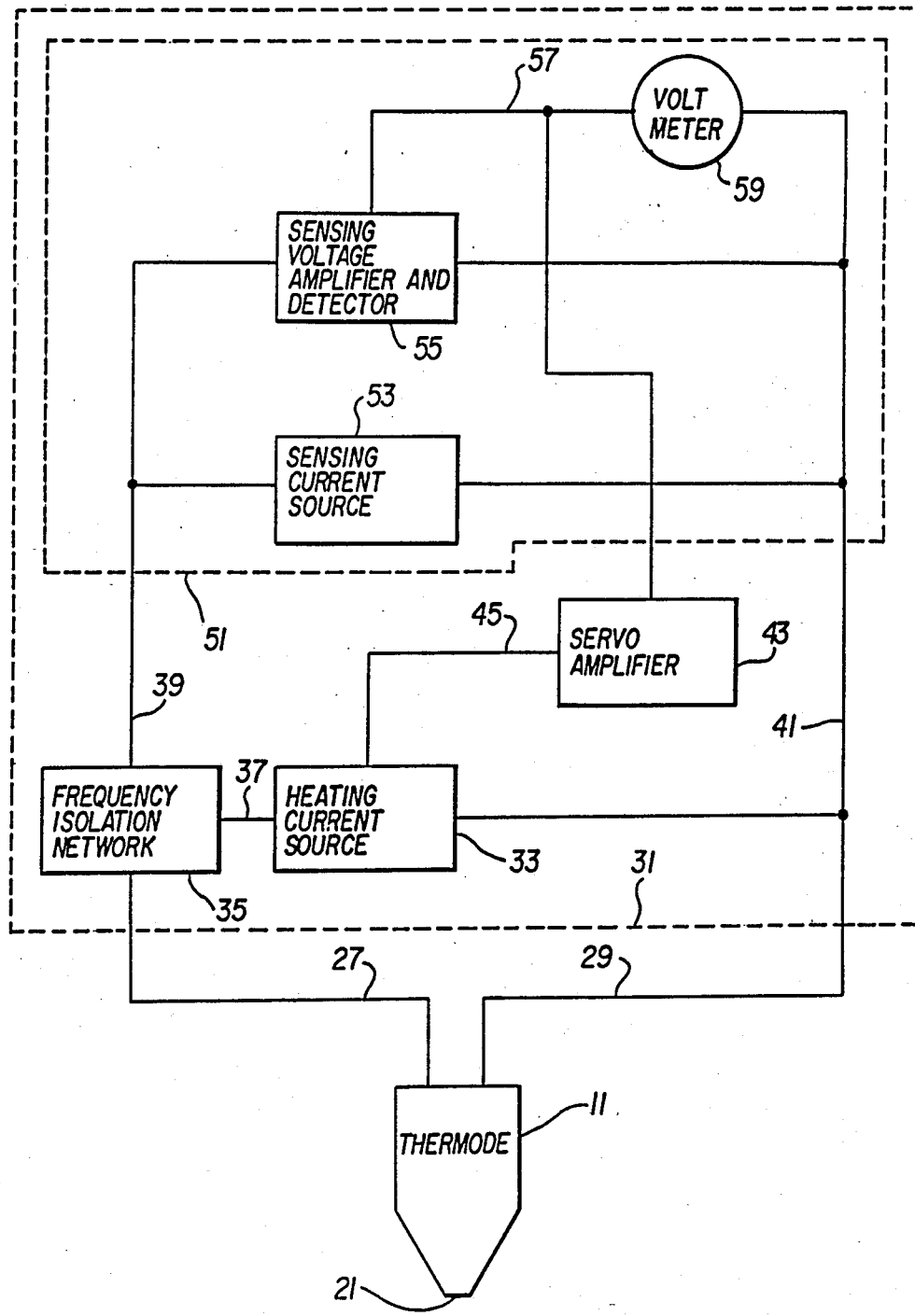
FIG. 2 is a flow diagram in block form illustrating typical circuit components for controlling the electrical circuit in which the termode shown in FIG. 1 is used.

Looking now at FIG. 2, a thermode 11, as shown in detail FIG. 1, is positioned in heating and control circuit 31 through lines 27 and 29. Circuit 31 has an electrical current source 33, a frequency isolation network 35, a serve control amplifier 43, and a monitoring portion 51. Electrical current source 33 supplies a current at some first frequency, preferably 0 to 1 kHz, for heating heater-sensor element 21. The first frequency current from electrical current source 33 is coupled to line 27 by port 37 of frequency isolation network 35. Port 39 of frequency isolation network 35 couples only a second frequency to line 27.

Monitoring portion 51 functions at this second frequency, and is connected into circuit 31 by line 39 and line 41. Monitoring portion 51 includes an electrical current source 53, a sensing voltage amplifier and detector 55, and a voltmeter 59. Electrical current source 53 supplies a sensing current at the second frequency for thermode 11, which is suitably imposed via circuit 31. Sensing voltage amplifier and detector 55 produces a direct current voltage on line 57 proportional to the second frequency voltage on line 39, which is suitably coupled from thermode 11 to line 39 via circuit 31. The direct current voltage on line 57 is then monitored by voltmeter 59.

Assuming a constant current from source 53, changes in electrical resistance of thermode 11 will be noted on voltmeter 59. As heater-sensor 21 is heated by current from source 33, a proportional change in the resistance of thermode 11, and thus the voltage on line 57, occurs.

Closed loop control of the temperature of heater-sensor 21 is provided by servo amplifier 43. The temperature dependent voltage on line 57 is coupled to servo amplifier 43 by line 61. Servo amplifier 43 produces appropriate voltages on line 45, which controls heating current source 33, to maintain a constant temperature at heater-sensor 21.

The microcapillary tube portion of the present apparatus is suitably fabricated of glass, although silica or quartz may be utilized if the environment in which the heat-sensor element is to be exposed is not compatible with glass. Borosilicate glass has been found to be particularly useful. Microcapillary tubes fabricated from 100 microliter Microcap tubing, a product of Drummond Scientific Co., Broomall, Pa., is aplly suited to use in the present invention. Microcapillary tubes made from soda glass generally are not useful because of cracking during a subsequent processing step wherein the tube is filled with molten metal.

Low melting point alloys are particularly useful as the internal electrically conductive material. Alloys having melting points between about 100° and about 500° C. are aptly suited to use. An alloy containing 58 percent by weight bismuth and 42 percent by weight tin having a melting point of about 140° C. has been found to be particularly suited to use.

The thermode may be filled with a metal, such as a low melting alloy as discussed above, by inserting a wire formed from the alloy into the microcapillary tube. The rear, or back, portion of the microcapillary tube is connected to a syringe using a short piece of tubing. Pressure is applied through the syringe while the microcapillary tube containing the wire is heated, suitably by a hot plate, to a temperature above the melting point of the alloy. At such temperature the molten metal will move toward the tip of the tube. In order to insure that the metal fills the tip of the microcapillary tube, heating and pressure is maintained until a small ball of metal appears from the tip. A second heating may be required. The filled microcapillary tube is then allowed to cool and the ball removed by gently flicking the tube.

The outside surface of the filled microcapillary tube is then coated with a thin, preferably uniform layer of a metal, suitably a noble metal, such as gold. Commercially available equipment used in electron microscopy field for sputtering is eminently useful in sputtering the present microcapillary tubes.

Although the critical elements of a thermode are present at this point, it is preferred to improve the electrical conductivity of the external layer of conductive material. Suitably a highly conductive metal, such as, silver is applied as an overcoat by painting or by vacuum evaporation. The overcoat does not extend to the portion of the thermode containing the heat-sensor element.

The outer, overcoat, conductive layer is preferably coated with an electrically insulating material to avoid ground loops in applications involving the use of the device in a bath, as would be encountered in patch-clamp recording. The insulation layer may be applied by briefly dipping the thermode in a bath of liquid insulating material and allowing such material to dry, or harden. A silicon resin marketed under the trademark "Sylgard" has been found to be eminently useful.

It will be understood that the embodiments described in the foregoing are illustrative of the invention and should not be considered as limiting, and that other embodiments of the invention are possible without departing from the scope of the invention.

What is claimed is:

1. An apparatus for heating, measuring, and controlling the temperature of an ultra small volume comprising:
   a. an electrically non-conducting thin-walled microcapillary tube containing an electrically conductive material.
   b. said microcapillary tube having an external coating of an electrically conductive material.
   c. said electrically conductive materials meeting at one end of said microcapillary tube to form a heater-sensor portion jucture comprised of an area of electrical resistance along said juncture, said area of electrical resistance having a diameter between about 0.5 and about 5.0 microns, said heater-sensor portion having a heater portion and a heat-sensor portion.
   d. means for applying an electrical current to said electrically conductive materials to heat said heater portion.
   e. means for monitoring the electrical resistance of said heat-sensor portion to determine the temperature thereof, and
   f. means for controlling the supply of electrical current to said heater-sensor portion.

2. The apparatus of claim 1 wherein said external coating of electrically conductive material has an overcoating of metal.

3. The apparatus of claim 1 wherein said overcoating has an overcoat of an electrically nonconducting material.

4. The apparatus of claim 1 wherein the electrically conductive material within said microcapillary tube is an alloy having a melting point between about 100° C. and about 250° C.

5. The apparatus of claim 1 wherein the electrically conductive material in the external coating is a noble metal.

6. The apparatus of claim 5 wherein the noble metal is gold.

7. The apparatus of claim 1 wherein said external coating of electrically conductive material has a metal overcoat.

8. The apparatus of claim 7 wherein said overcoat is a noble metal.

9. The apparatus of claim 8 wherein said noble metal is silver.

10. The apparatus of claim 1 wherein the means for controlling the supply of electrical current is a closed-loop servo circuit responsive to said means for monitoring the electrical resistance of said heater-sensor portion.

* * * * *